Patented Jan. 16, 1923.

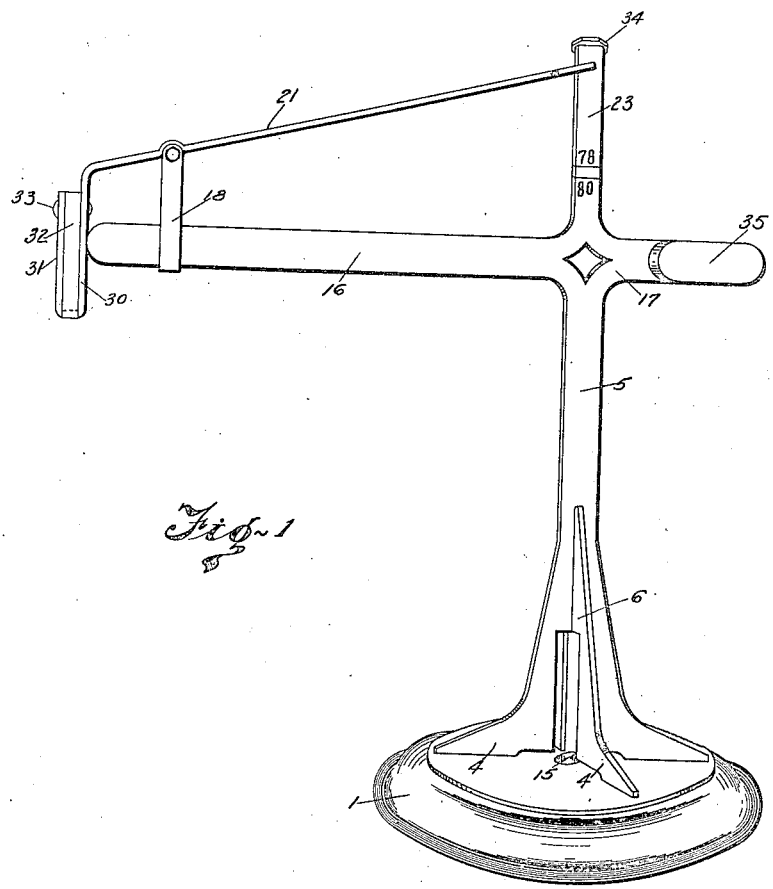

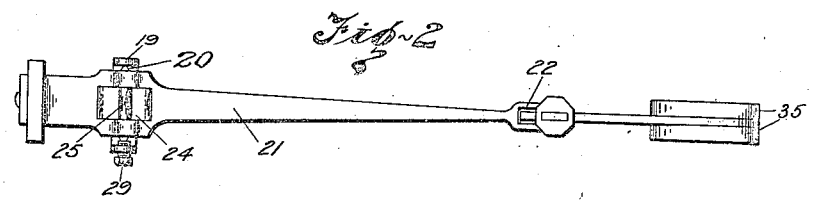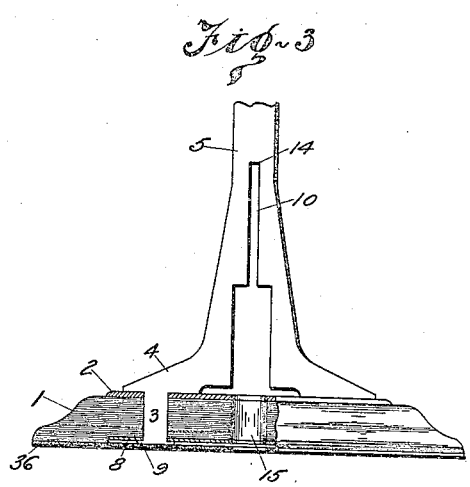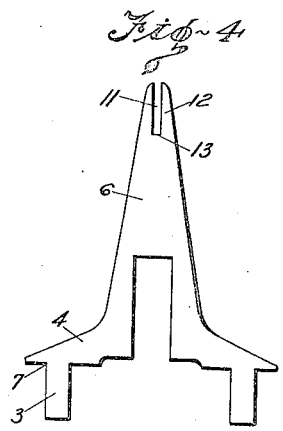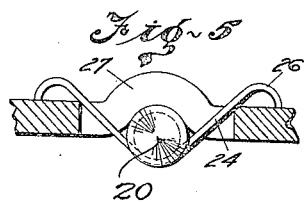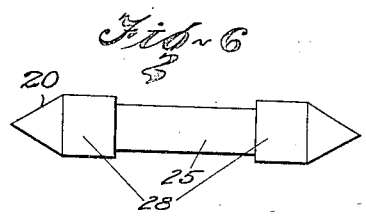

1,442,370

UNITED STATES PATENT OFFICE.

EDWARD J. TOMLINSON, OF NEWARK, NEW JERSEY, ASSIGNOR TO SPLITDORF ELECTRICAL COMPANY, OF NEWARK, NEW JERSEY.

PHONOGRAPH METER.

Application filed May 10, 1920. Serial No. 380,104.

*To all whom it may concern:*

Be it known that I, EDWARD J. TOMLINSON, a citizen of the United States, residing at Newark, in the county of Essex, State of New Jersey, have invented certain new and useful Improvements in Phonograph Meters, of which the following is a description, reference being had to the accompanying drawing and to the figures of reference marked thereon.

This invention relates to an instrument for measuring the rotative speed of the body to which it may be applied. It is particularly adapted for use in measuring the speed of rotation of a phonograph sound record body, the revolutions being visually indicated by the instrument.

The object of my invention is to provide a meter which when applied to measuring the revolutions of the sound record body, may be set directly on the moving body or its rotating support. After the speed has been registered on the meter and the machine adjusted to give the right speed as indicated by the meter, the same may be quickly removed.

Another object of my invention is to provide a meter of the type described, which will be simple and inexpensive, yet ornamental and accurate in its operation.

Other and further objects will be apparent to anyone skilled in the art after a study of the annexed drawings taken in connection with this specification, wherein—

Figure 1 is a perspective view of the meter.

Figure 2 is a top plan view of Figure 1, with the base and bottom of the upright member removed.

Figure 3 is a part sectional view of the base showing the manner of attaching the upright member thereto but without the support brace;

While Figure 4 is a view of the support brace removed from its association with the parts shown in Figures 1 and 3.

Figure 5 is an enlarged view of a preferred form of pivot mounting for the movable pointer.

Figure 6 is a view of the pivot pin enlarged.

Referring now to the details wherein like numbers refer to corresponding parts in the various views, 1 is a base, preferably constructed of some suitable moulded material. Positioned on the top of the base 1 is a plate 2, having perforations to receive the lugs 3 that are attached to the feet 4 of both the upright member 5 and the brace 6. Members 5 and 6 are preferably punched from flat stock. It will be noticed that the shoulders 7 of the feet 4 engage and rest against plate 2. The bottom of the base is recessed and within this recess is carried a plate 8, having perforations to receive the lugs 3, which are riveted over the plate 8 as indicated by the numeral 9. (See Figure 3). The brace 6 is held to the base 1 in the same manner as the upright member 5, which has a slot 10 to receive the upper part of the brace 6 that in turn has a slot 11 forming fingers 12 that pass upward on either side of the vertical member 5 so that the bottom 13 of slot 11 engages the bottom 14 of slot 10. This construction shown in the assembly drawing Figure 1 gives a very rigid and substantial fastening for the upright member 5 to the base 13, which has attached to the bottom a piece of soft material 36, such as felt. The center of the base as well as the plates 2 and 8 have a hole 15, which is adapted to fit over the nut or stud which holds the sound record support to its shaft, whereby the meter is held in position on the phonograph.

The upper end portion of the vertical member 5 has a relatively long arm 16 and a short arm 17. On the outer end of the arm 16 is fastened in any suitable manner, a stirrup 18 between the arms 19 of which a pivot rod 20 is carried. On the pivot rod 20 is attached a pointer 21, the outer end of which is preferably bifurcated so as to have fingers 22, which pass on either side of the top 23 of the member 5. The end of the pointer 21 at the pivotal point is perforated and in this perforation is carried a resilient member 24, which passes underneath the pivot pin 20, resting in a shouldered portion 25. The outer ends of the spring 24 are slightly turned over at 26 into engagement with the body of the pointer. The metal of the pointer on either side of the perforation is punched upwardly as indicated at 27, forming bearing seats for the shoulders 28 of the pivot pin 20. It will be seen from this construction that the resilient member 24 holds the pointer 21 to the pivot pin 20. In the construction shown the pin 20 has one end directly in engagement with one of the ears 19, while the other end is seated in an adjustable bearing 29. The outer end of the pointer 21 has a downwardly bent portion 30 which is preferably turned upward at 31, and between the two portions 30 and 31 is fastened a weight 32, a rivet 33 being indicated for this purpose. It will be seen from Figure 1 that in the normal or inoperative position of the meter, the portion 30 and weight 32 rest against the outer end of the arm 16 so that the fingers 22 do not come in contact with the cap plate 34, so that the strain is taken off that part of the pointer which performs the indication.

As the speed of the ordinary phonograph is approximately 78, I calibrate the meter to this speed. In some cases, I may also add a few calibration marks on either side of this preferred speed mark of 78.

The outer end of the short arm 17 is weighted as indicated by 35 in order to balance the meter whereby the same will not readily fall in the direction of the weight 32.

It will be readily apparent that when this type of meter is set on the rotating sound record support that the tendency for the weight 32 is to move outward away from the pivot 20 and the pointer 21 will register the speed of rotation.

While I have shown the preferred form of my device, it will be apparent that numerous changes may be made in the details of construction, without departing from the spirit of my invention and the scope of the appended claims.

Having thus described my invention, what I claim is:—

1. In a device of the character described, in combination, a base, an upright member fastened to said base and having speed indicating marks thereon, arms extending on each side of said member, one of said arms having a balancing weight thereon while the other carries a support, said support having two legs with a pivot pin therebetween, a pointer having bearing surfaces on one side to fit said pin and resilient means for holding the pointer to the pin, said pointer being weighted at one end so as to respond to centrifugal force whereby it will indicate at its opposite end the revolutions of the device.

2. In a device of the character described, in combination, a base, an upright member fastened to said base and having speed indicating marks thereon, arms extending on each side of said member, one of said arms having a balancing weight thereon while the other carries a support, said support having two legs with a pivot pin therebetween, said pin having a central reduced portion, a pointer having bearing surface on one side formed to fit the contour of the pin adjacent the reduced portion and a cutout portion, a spring passing around the pin opposite to the said bearing surface and positioned thereon by seating in the reduced portion of said pin and extending through the cutout portion of the pointer and having its ends engaging the surface of the pointer whereby the pointer is held securely to the pin, said pointer being weighted at one end so as to respond to centrifugal force whereby it will indicate at its opposite end the revolutions of the device.

3. A speed indicator comprising a sheet metal upright member having indicating marks thereon and having integral laterally projecting arms at a point intermediate the ends thereof, a sheet metal stirrup secured to one of the lateral arms, a sheet metal pointer pivotally mounted in said stirrup, a finger at one end of said pointer, said pointer having its end nearest the stirrup bent downward and then upward and carrying a counterweight between said bent portions.

4. A speed indicator comprising a base, a sheet metal upright member having indicating marks thereon and having integral laterally projecting arms at a point intermediate the ends thereof, a sheet metal pointer pivotally mounted on one of said lateral arms, a finger at one end of said pointer, said pointer at the end opposite the finger being U-shaped and carrying a weight in said U portion.

In testimony whereof, I affix my signature.

EDWARD J. TOMLINSON.